United States Patent
Isozaki et al.

(10) Patent No.: US 8,031,868 B2
(45) Date of Patent: Oct. 4, 2011

(54) APPARATUS, METHOD, AND COMPUTER PROGRAM PRODUCT FOR RECORDING CONTENT

(75) Inventors: Hiroshi Isozaki, Kanagawa (JP); Taku Kato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 813 days.

(21) Appl. No.: 11/530,366

(22) Filed: Sep. 8, 2006

(65) Prior Publication Data

US 2007/0206798 A1   Sep. 6, 2007

(30) Foreign Application Priority Data

Feb. 27, 2006  (JP) ................................. 2006-051285

(51) Int. Cl.
*H04N 7/167* (2011.01)
*H04N 7/16* (2011.01)
*G06F 7/04* (2006.01)
*G06F 17/30* (2006.01)

(52) U.S. Cl. .......... 380/200; 380/201; 380/203; 726/26; 726/32; 726/33

(58) Field of Classification Search .......... 380/200–242; 726/26–33

See application file for complete search history.

(56) References Cited

U.S. PATENT DOCUMENTS

| | | | | |
|---|---|---|---|---|
| 7,120,250 | B2 * | 10/2006 | Candelore | 380/200 |
| 7,120,251 | B1 * | 10/2006 | Kawada et al. | 380/201 |
| 2002/0123968 | A1 | 9/2002 | Okayama et al. | |
| 2002/0152387 | A1 * | 10/2002 | Asano | 713/176 |
| 2002/0164034 | A1 * | 11/2002 | Asano et al. | 380/278 |
| 2003/0009681 | A1 * | 1/2003 | Harada et al. | 713/193 |
| 2004/0049694 | A1 * | 3/2004 | Candelore | 713/200 |
| 2004/0213408 | A1 * | 10/2004 | Kim et al. | 380/200 |
| 2005/0038997 | A1 | 2/2005 | Kojima et al. | |
| 2005/0154608 | A1 * | 7/2005 | Paulson et al. | 705/1 |
| 2005/0163030 | A1 * | 7/2005 | Irie et al. | 369/275.3 |
| 2005/0177740 | A1 | 8/2005 | Athaide et al. | |
| 2006/0143478 | A1 * | 6/2006 | Morino et al. | 713/193 |
| 2006/0233372 | A1 * | 10/2006 | Shaheen et al. | 380/255 |

FOREIGN PATENT DOCUMENTS

JP       2000-353361       12/2000

(Continued)

OTHER PUBLICATIONS

Advanced Access Content System; pre-reorded Vidio Book. 0.90 Preliminary Draft, Apr. 14, 2005.*

(Continued)

*Primary Examiner* — Edan Orgad
*Assistant Examiner* — Jahangir Kabir
(74) *Attorney, Agent, or Firm* — Oblon, Spivak, McClelland, Maier & Neustadt, L.L.P.

(57) ABSTRACT

A content recording apparatus includes a key selecting unit that selects an encryption key for performing an encrypting process to adjunct data from pieces of information recorded on a recording medium, when a user generates the adjunct data which is data derived from a title content, wherein the recording medium records thereon a title key for encrypting the title content as program content and content data including the title content encrypted by the title key. The content recording apparatus also includes an encryption processing unit that performs an encrypting process to the adjunct data by the selected encryption key; and a recording unit that records the adjunct data to which the encryption process is performed and the selected encryption key in the recording medium.

17 Claims, 14 Drawing Sheets

FOREIGN PATENT DOCUMENTS

| | | |
|---|---|---|
| JP | 2001-222861 | 8/2001 |
| JP | 2001-331106 | 11/2001 |
| JP | 2002-247024 | 8/2002 |
| JP | 2003-22609 | 1/2003 |
| JP | 2003-22612 | 1/2003 |
| JP | 2003-69548 A | 3/2003 |
| JP | 2003-141816 | 5/2003 |
| JP | 2003-158514 A | 5/2003 |
| JP | 2004-07494 | 1/2004 |
| JP | 2004-138717 | 5/2004 |
| JP | 2005-39480 A | 2/2005 |
| JP | 2005-252773 A | 9/2005 |
| JP | 2005-316994 A | 11/2005 |
| WO | WO 01-48755 A1 | 5/2001 |
| WO | WO 2006-008986 | 1/2006 |

OTHER PUBLICATIONS

"Advanced Access Content System (AACS): Recordable Video Book", AACS Revision 0.91, Feb. 17, 2006, 23 Pages.
"Advanced Access Content System (AACS): HD DVD Recordable Book", AACS Revision 0.91, Feb. 17, 2006, 53 Pages.
U.S. Appl. No. 10/591,179, filed Aug. 30, 2006, Isozaki et al.
Second Office Action from State Intellectual Property Office of the People's Republic of China, mail date of Dec. 16, 2010.
Office Action issued Apr. 26, 2011 in Japanese Patent Application 2006-051285, filed Feb. 27, 2006 (with English translation)—8 pages.

* cited by examiner

FIG.2
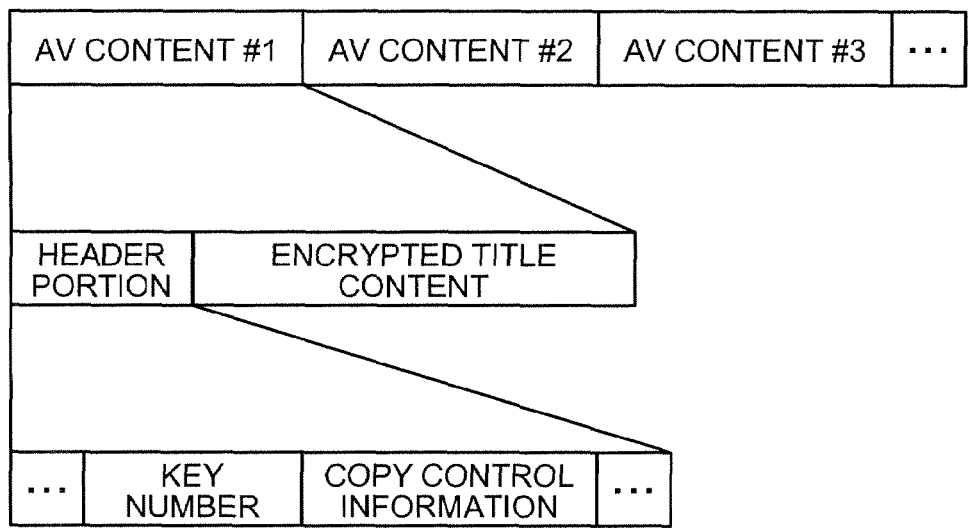
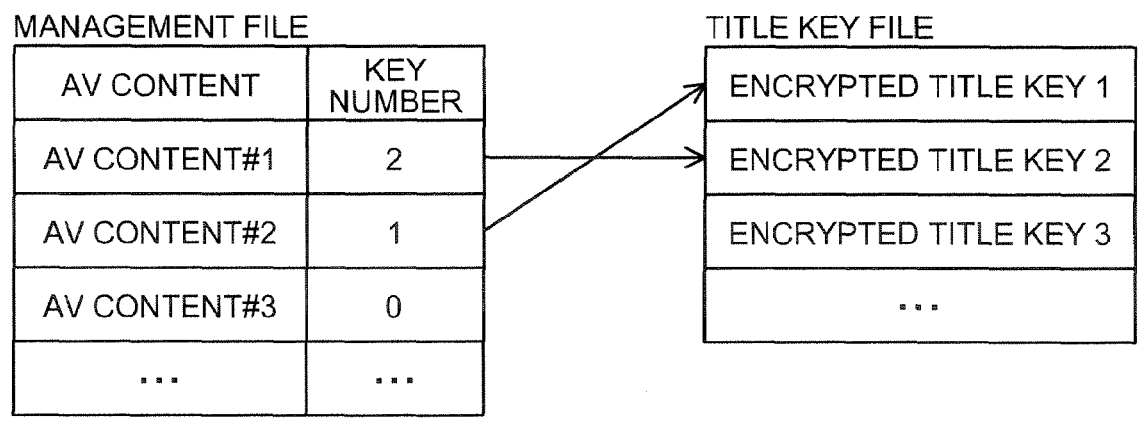

FIG.4

| FILE ID |
| KEY NUMBER |
| FILE SIZE |
| ENCRYPTED ADJUNCT DATA |

FIG.5

MANAGEMENT FILE

| AV CONTENT | KEY NUMBER |
|---|---|
| AV CONTENT #1 | 2 |
| AV CONTENT #2 | 1 |
| AV CONTENT #3 | 0 |
| ... | ... |

TITLE KEY FILE

| ENCRYPTED TITLE KEY 1 |
|---|
| ENCRYPTED TITLE KEY 2 |
| ENCRYPTED TITLE KEY 3 |
| ... |

COPY CONTROL INFORMATION ON CONTENT (No More Copies)

AV CONTENT #1
KEY NUMBER (2)

IMAGE DATA
KEY NUMBER (2)

AV CONTENT #2
KEY NUMBER (1)

KEY NUMBER (4)

AV CONTENT #3
KEY NUMBER (0)

COPY CONTROL INFORMATION ON CONTENT (EPN)

APPARATUS, METHOD, AND COMPUTER PROGRAM PRODUCT FOR RECORDING CONTENT

This application is based upon and claims the benefit of priority from the prior Japanese Patent Application No. 2006-51285, filed on Feb. 27, 2006; the entire contents of which are incorporated herein by reference.

BACKGROUND OF THE INVENTION

1. Field of the Invention

The present invention relates to content recording apparatus, method, and computer program product for recording adjunct data in a recording medium. The adjunct data is data of a part of title content as program content.

2. Description of the Related Art

Conventionally, for example, as disclosed in documents of Advanced Access Content System (AACS) Recordable Video Book Revision 0.90 and Content Protection for Recordable Media (CPRM), in order to prevent illegal copy of the content recorded on a recording medium such as DVD, there is known a technique in which an encrypting process is performed on each of plural title content which are of a video or audio content of a program using title keys which are different in each of the title content, and the encrypted title content are recorded on the DVD medium.

In the conventional technique, each of the plural title keys is encrypted using a device key imparted in each playing apparatus such as a DVD recorder for duly recording and playing the content, and the encrypted title key is registered in the title key file and recorded on the DVD medium. When the title content is played, the encrypted title key registered in the title key file is decrypted using the device key of the recording and playback apparatus used for the play back, and the title content is decrypted with the decrypted title key to play the title content.

When a part of the title content is deleted in a rewritable DVD medium, the title key file is also updated. Specifically, the title key file is decrypted once, the title key file in which the title key corresponding to the title content deleted from the DVD medium is encrypted again using the device key, and the title key file is recorded on the DVD medium. Therefore, the title key corresponding to the deleted title content can previously be copied to prevent attack which illegally plays the title content deleted with the title key.

The above conventional technique is an effective technique in which the content input from the outside through a broadcast is protected and recorded on the recording medium such as the DVD medium to prevent unauthorized use of the content.

However, the conventional technique insufficiently protects the content (hereinafter referred to as "adjunct data") newly generated by the recording and playing apparatus. The adjunct data is derived from AV content in which the content including the video data and audio data is compressed by an encoding method such as MPEG2 or H.264.

For example, the adjunct data is data, such as a thumbnail image or an audio file, which is used for a menu screen. Examples of the adjunct data also include data having image data compressed by the image compression format such as JPEG or GIF and audio data digitalized by an audio compression format such as LPCM or MP3. The adjunct data is image and audio content which is recorded on the DVD medium in the format different from the AV content. For generation of the adjunct data, for example the AV content whose copyright is protected are encrypted by the title key, one scene is extracted as an image file from the AV content, the image file is converted into image data to form a file, the image data file is recorded on the DVD medium, and the thumbnail is formed from the image data file. Therefore, the menu screen indicating a list of title content is generated.

Conventionally, the usage of the adjunct data is limited to the thumbnail image and the like, and the adjunct data is outputted as a file while resolution of the adjunct data is suppressed lower than the resolution of the AV content which becomes a generation source of the adjunct data. Therefore, the usage is limited and there have been a few very serious problems with the copyright.

However, in the case where the adjunct data is used for a background image of the menu screen, it is thought that the adjunct data is recorded on the DVD medium while formed in a plaintext. In this case, an unauthorized user possibly copies the adjunct data from the DVD medium to another recording medium such as a hard disk, or an unauthorized user possibly illegally distributes the adjunct data through the Internet beyond the range of fair uses in section 107 of the copyright law in the United States or private uses in section 30 of the copyright law in Japan. The adjunct data is a part of the AV content because the adjunct data is generated from the AV content. As a result, although the AV content is protected, the AV content is not protected when the adjunct data is distributed without protection.

SUMMARY OF THE INVENTION

According to one aspect of the present invention, a content recording apparatus includes a key selecting unit that selects an encryption key for performing an encrypting process to adjunct data from pieces of information recorded on a recording medium, when a user generates the adjunct data which is data derived from a title content, wherein the recording medium records thereon a title key for encrypting the title content as program content and content data including the title content encrypted by the title key; an encryption processing unit that performs an encrypting process to the adjunct data by the selected encryption key; and a recording unit that records the adjunct data to which the encryption process is performed and the selected encryption key in the recording medium.

According to another aspect of the present invention, a content recording method includes selecting an encryption key for performing an encrypting process to adjunct data from pieces of information recorded on a recording medium, when a user generates the adjunct data which is data derived from a title content, wherein the recording medium records thereon a title key for encrypting the title content as program content and content data including the title content encrypted by the title key; performing an encrypting process to the adjunct data by the selected encryption key; and recording the adjunct data to which the encryption process is performed and the selected encryption key in the recording medium.

A computer program product according to still another aspect of the present invention causes a computer to perform the method according to the present invention.

BRIEF DESCRIPTION OF THE DRAWINGS

FIG. 2 is a view showing data structures of AV content, a title key file, and a management file;

FIG. 4 is a view showing a data structure of an encapsulated file;

FIG. 5 is an explanatory view showing title key selection;

DETAILED DESCRIPTION OF THE INVENTION

Preferred embodiments of the content recording apparatus, the content recording method, and the content recording program product will be described in detail with reference to the accompanying drawings.

A First Embodiment Will Be Described

Figure 1:
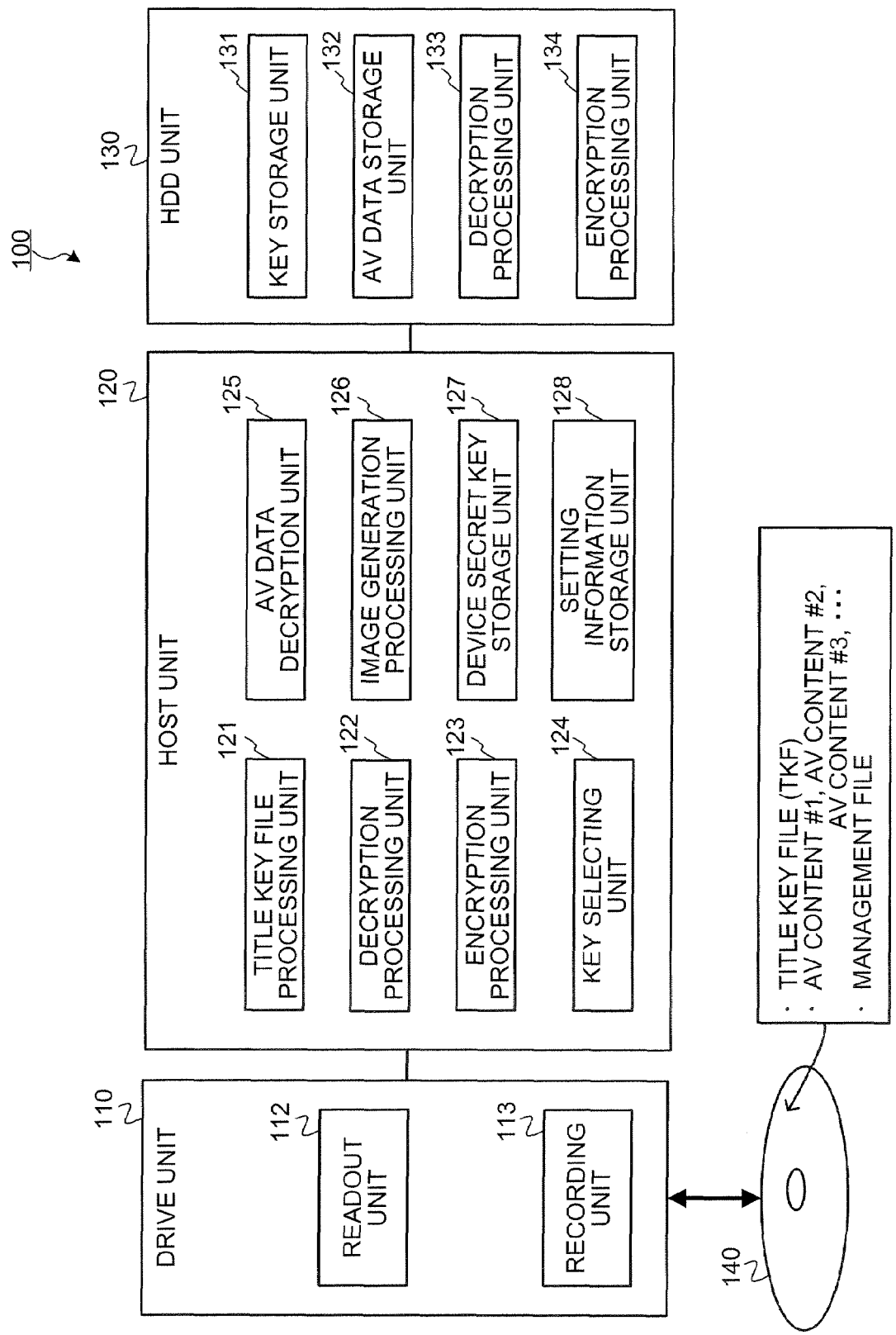
FIG. 1 is a block diagram showing a functional configuration of a DVD recorder according to a first embodiment.

FIG. 1 is a block diagram showing a configuration of a content recording and playing apparatus 100 according to the first embodiment. A DVD/HD DVD recorder which performs the recording and playback on a recordable DVD and an HD DVD medium (hereinafter referred to as "DVD medium 140") can be cited as an example of the content recording and playing apparatus 100. As shown in FIG. 1, the content recording and playing apparatus 100 of the first embodiment (hereinafter referred to as "DVD recorder 100") includes a drive unit 110, a host unit 120, and a HDD unit 130. The drive unit 110 records data in the DVD medium 140, and reads data from the DVD medium 140. The host unit 120 performs the encrypting process and decrypting process of the title content and title key, and the host unit 120 also performs a process of generating the later-mentioned adjunct data from the decrypted title content. The title content is stored in the HDD unit 130. The drive unit 110 and the host unit 120 and the host unit 120 and the HDD unit 130 are connected with a generic bus or a dedicated special bus, respectively.

Although the DVD recorder 100 is configured to include the HDD unit 130 in the first embodiment, the DVD recorder 100 may be configured not to include the HDD unit 130.

As shown in FIG. 1, a title key file (TKF), plural AV content (AV content #1, AV content #2, and AV content #3), and a management file are recorded on the DVD medium 140 as a file, respectively. In the first embodiment, a rewritable medium in which the title key file can be rewritten is used as an example of the DVD medium 140.

A DVD medium pursuant to a HD DVD video recording specification is a target format of the DVD medium 140 used in the DVD recorder 100 of the first embodiment. However, the DVD medium 140 is not always limited to the DVD medium pursuant to the HD DVD video recording specification.

Various pieces of data recorded on the DVD medium 140 will be described below. FIG. 2 schematically shows data structures of the AV content, title key file, and management file which are recorded on the DVD medium 140.

The AV content is formed in each program. As shown in FIG. 2, the AV content is formed by a set of plural packets including a set of a header portion and encrypted title content.

The encrypted title content is content in which the title content is encrypted by the title key and the later-mentioned copy control information included in the title content. The title key is encrypted by the device secret key assigned in each DVD recorder 100 from a license organization, and the title key is recorded on the form of the title key file. As used herein, the title content shall mean a unit of the content of the program video or audio. For example, the content of one movie becomes one title content. The title content includes video data and audio data, and the title content is data compressed by a coding method such as MPEG-2 or H.264.

The title key is a key with which the title content is encrypted. In the first embodiment, the different title key is used for the title content in each case. However, the invention is not limited to the first embodiment, but the plural title content may be encrypted by the same title key.

As shown in FIG. 2, the header portion includes a key number and the copy control information. The key number is a pointer which indicates a record position from the head of the title key file of the encrypted title key. The title key is encrypted to form the encrypted title key, and the encrypted title key is used when the title content is encrypted. For example, in FIG. 2, assuming that the key number of the AV content #1 is 3, the encrypted title key corresponding to the title content of the AV content #1 becomes the encrypted title key 3 which is located in the third record from the head of the title key file.

When the title content is the plaintext, the title content of the plaintext is included in the AV content instead of the encrypted title content. In this case, the encryption is not performed by the title key, and the key number is set at 0. That is, based on whether the key number field of the AV content is set at 0 or a number which is not 0, it is possible to determine whether the title content is the plaintext or the encrypted title content.

In the first embodiment, the key number is set at 0 when the title content is the plaintext. The invention is not limited to the first embodiment, but the key number may be set at an arbitrary number which does not correspond to the record position from the head of the title key file.

The copy control information is information which indicates restriction on the copy of the title content. "Copy Free", "Copy Never", "No More Copies", "Copy One Generation", "EPN", and the like are set in the copy control information.

"Copy Free" indicates that the title content can be copied without restriction, and "Copy Never" indicates that the title content cannot be copied. "Copy One Generation" indicates that the title content can be copied only in one generation. "No More Copies" indicates the state in which the title content cannot be copied in the copy control information because the title content of "Copy One Generation" is already copied once and a first generation recording cannot be copied again, namely, "No More Copies" indicates that the copy is prohibited. "EPN" (Encryption Plus Non-assertion) indicates that the number of copies and the generation are not restricted in making the copy although the copyright is protected by performing the encrypting process to the title content. The title content is not encrypted in the case of "Copy Free", and the title content is encrypted in the states except for "Copy Free". The copy control information is used to encrypt the title content, so that the illegal change of the copy control information can be prevented.

The title key file is a file in which the plural encrypted title keys are registered. In the encrypted title key, each title key corresponding to the plural title content is encrypted by the device secret key.

The management file is a file which manages the title key corresponding to the encrypted title content of the AV content. As shown in FIG. 2, the key number which indicates the record position from the head of the title key file of the corresponding encrypted title key is registered in each of the AV content. For example, in FIG. 2, because the key number of the AV content #1 is 2, the encrypted title key corresponding to the title content of the AV content #1 becomes the encrypted title key 2 which is located in the second record from the head of the title key file.

Similarly to the key number of the header portion, when the title content is the plaintext, the key number is set at 0 in the corresponding AV content of the management file. Therefore, based on whether the key number field of the management file is set at 0 or a number which is not 0, it is possible to determine whether the title content included in the AV content is the plaintext or the encrypted title content.

In the first embodiment, the encrypted title key corresponding to the encrypted title content of the AV content is designated by both the management file and the key number of the header portion of the AV content. However, the encrypted title key corresponding to the encrypted title content may be designated by either the management file or the key number of the header portion of the AV content.

Returning to FIG. 1, the drive unit 110 includes a readout unit 112 and a recording unit 113. The readout unit 112 directly reads the data from the DVD medium 140, and the recording unit 113 directly records the data in the DVD medium 140.

As shown in FIG. 1, the host unit 120 includes a title key file processing unit 121, a decryption processing unit 122, an encryption processing unit 123, a key selecting unit 124, an AV data decoding unit 125, an image generation processing unit 126, a device secret key storage unit 127, and a setting information storage unit 128. Although the host unit 120 of the first embodiment includes the setting information storage unit 128, the host unit 120 may be configured not to include the setting information storage unit 128.

The key selecting unit 124 selects the proper title key from the title keys registered in the title key file, and the key selecting unit 124 selects the title key used in decrypting the title content. The key selecting unit 124 selects the title key used in encrypting the adjunct data in a content recording process. In the content recording process, the key selecting unit 124 generates the title key with which the adjunct data is encrypted, when the copy control information on the title content indicates that the title content can be copied with restriction like "Copy One Generation" and "EPN".

In the content playback process, the key selecting unit 124 selects the proper encrypted title key from the encrypted title keys registered in the title key file, and the key selecting unit 124 selects the title key which decrypts the encrypted title content or the adjunct data.

The encryption processing unit 123 encrypts the title content using the title key selected by the key selecting unit 124. The encryption processing unit 123 encrypts the adjunct data using the title key selected by the key selecting unit 124 or the title key generated by the key selecting unit 124.

The decryption processing unit 122 decrypts the encrypted title content and encrypted adjunct data using the title key selected by the key selecting unit 124.

The title key file processing unit 121 decrypts the title key (encrypted title key) which is encrypted and stored in the title key file, and the title key file processing unit 121 encrypts the title key to register the title key in the title key file.

The AV data decoding unit 125 decodes the compressed title content and adjunct data to convert the title content and adjunct data into data having a non-compression format. The image generation processing unit 126 detects a necessary part in the form of the image data from the title content having the non-compression format by user's specification or the setting of the recorder, and the image generation processing unit 126 generates the adjunct data by extracting the image data to convert the image data into the image compression format.

As used herein, the adjunct data shall mean data which is generated by deriving the data from the title content. An example of the adjunct data includes data, such as the thumbnail image and the audio file, which is generated from the title content and used for a menu screen. An example of the adjunct data also includes data having image data compressed by the image compression format such as JPEG or GIF and audio data digitalized by a audio compression format such as LPCM and MP3. The adjunct data is content which can be recorded on the DVD medium 140 in the format different from the title content. In the following description, the image file is used as the adjunct data by way of example. However, the invention can also be applied even if a file other than the image file is used as the adjunct data.

The device secret key storage unit 127 is a recording medium such as a memory, in which the device secret key is stored and kept confidential. The device secret key is used to encrypt and decrypt the title key which is assigned to a manufacturer of the DVD recorder 100 by the license organization.

The setting information storage unit 128 is a recording medium such as a memory, in which setting information is stored. The setting information indicates a type of the key with which the adjunct data is encrypted. Specifically, the setting information is data for indicating whether the adjunct data is encrypted by the same key as the title key corresponding to the title content from which the adjunct data is derived or the adjunct data is encrypted by the newly generated title key.

As shown in FIG. 1, the HDD unit 130 includes a key storage unit 131, an AV data storage unit 132, a decryption processing unit 133, and an encryption processing unit 134.

The key storage unit 131 is a recording medium, such as a hard disk drive (HDD) or a memory, in which the title key used in encrypting the title content is stored. The AV data storage unit 132 is a recording medium such as HDD, in which the encrypted title content copied or moved from the DVD medium 140 is stored.

The decryption processing unit 133 decrypts the encrypted title content and the adjunct data using the title key stored in the key storage unit 131. The encryption processing unit 134 encrypts the title content and adjunct data, stored in the AV data storage unit 132, using the title key stored in the key storage unit 131.

The DVD recorder 100 of the first embodiment adopts the above configuration to generate the adjunct data. However, the invention is not limited to the DVD recorder 100 of the first embodiment, but the DVD recorder 100 may include a processing unit having another function.

Figure 3:
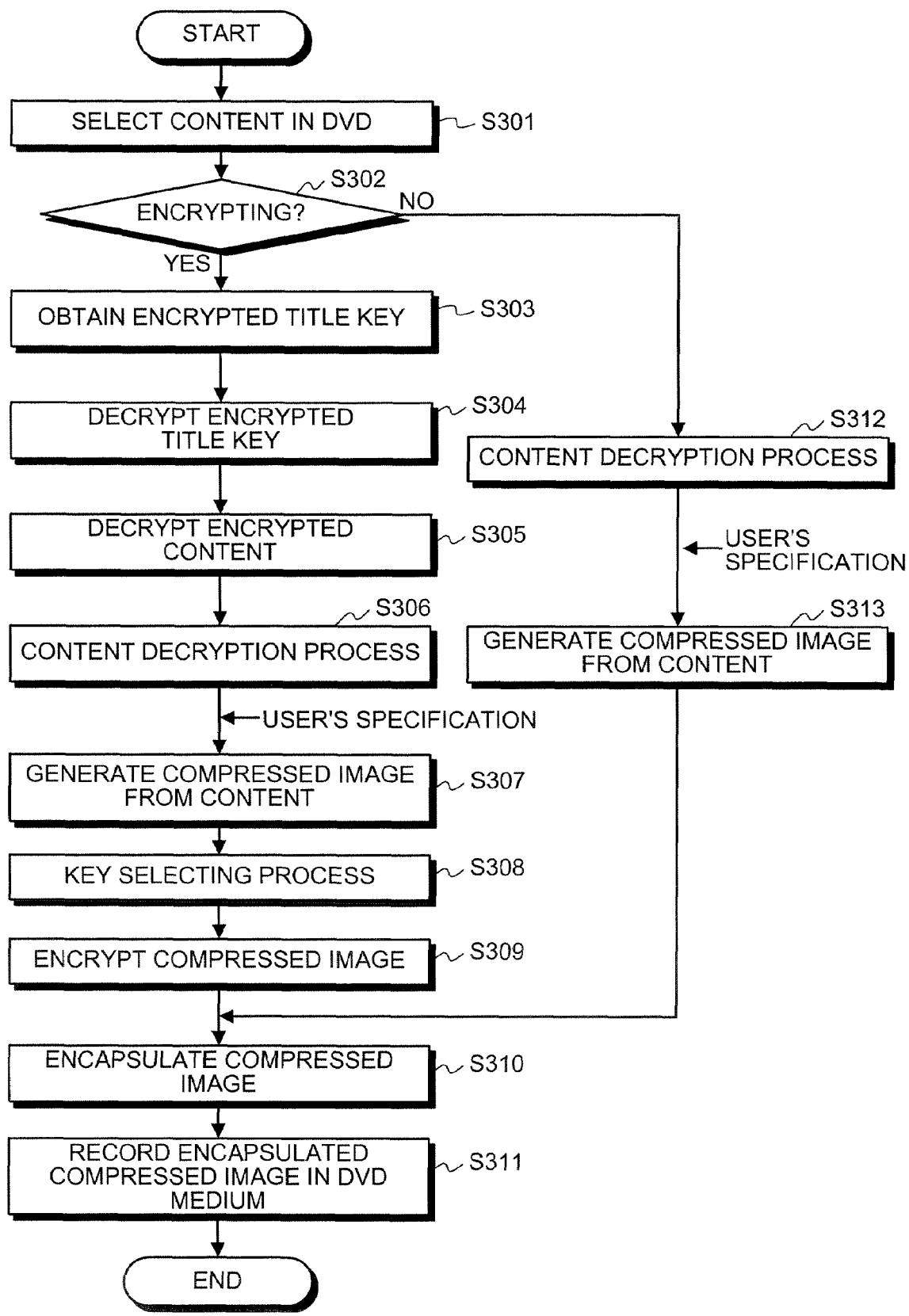
FIG. 3 is a flowchart showing an adjunct data generating process according to the first embodiment.

Then, an adjunct data generating process performed by the DVD recorder 100 of the first embodiment will be described. FIG. 3 is a flowchart showing the adjunct data generating process performed by the DVD recorder 100 of the first embodiment.

Specifically, the adjunct data generating process is a process of generating the thumbnail image or a background image used for the menu screen from the title content of the AV content recorded on the DVD medium 140.

At this point, in an initial state of the DVD medium 140, the AV content, the title key file, and the management file are recorded as the file in the medium. Sometimes the AV content including the encrypted title content and the AV content including the unencrypted title content are mixed in one DVD medium 140. In the first embodiment, it is assumed that the AV content including the encrypted title content and the AV content including the unencrypted title content are also mixed. That is, the AV content #1 and the AV content #2 are encrypted by the title key while the title content of the AV content #3 is the plaintext.

The host unit 120 selects the AV content including the title content which becomes an extraction source of the adjunct data (Step S301).

Then, the key selecting unit 124 refers to the management file, recorded on the DVD medium 140, to check whether or not the title content is encrypted (Step S302). Specifically, as described above, it is determined whether the key number corresponding to the AV content which becomes the extraction source in the management file is 0 or not.

When the title content is the plaintext (No in Step S302), the AV data decoding unit 125 decodes the title content of the AV content (Step S312). In Step S313, when a desired range is assigned by the user's specification or the device setting, the image generation processing unit 126 extracts the image data in the form of a still image. The image data is generated from the decoded title content for a predetermined playback time. Then, the image generation processing unit 126 converts the extracted image data into the image compression format to generate the compressed image. The compressed image becomes the adjunct data.

On the other hand, when title content is encrypted (Yes in Step S302), the title key file processing unit 121 refers to the management file to obtain the encrypted title key from the title key file (Step S303).

Next, the title key file processing unit 121 decrypts the obtained encrypted title key using the device secret key stored in the device secret key storage unit 127 (Step S304).

Then, the decryption processing unit 122 decrypts the encrypted title content using the title key which is encrypted to become the plaintext and the copy control information included in the AV content (Step S305). At this point, in the encryption, part (for example, several bits) of the copy control information is used.

The decryption processing unit 122 may be configured such that, in the title content decrypting process, the determination whether or not the encrypted title key assigned in the management file correspond to the key used in encrypting the actual title content is made by comparing the encrypted title key assigned in the management file to the value of the key number field included in the header portion of the AV content.

The AV data decoding unit 125 decodes the title content which already becomes the plaintext (Step S306). In Step S307, when the desired range is assigned by the user's specification or the device setting, the image generation processing unit 126 extracts the image data in the form of a still image. The image data is generated from the decoded title content for a predetermined playback time. Then, the image generation processing unit 126 converts the extracted image data into the image compression format to generate the compressed image. The compressed image becomes the adjunct data.

The key selecting unit 124 selects the title key with which the adjunct data is encrypted from the title key file recorded on the DVD medium 140, or the key selecting unit 124 performs a key selecting process of newly generating the title key with which the adjunct data is encrypted (Step S308). The detailed key selecting process will be described later.

The encryption processing unit 123 encrypts the compressed image which is the adjunct data by using the title key selected or generated in Step 308 (Step S309).

The recording unit 113 encapsulates the encrypted compressed image, i.e., the encrypted adjunct data by forming the encrypted adjunct data in a single file along with a file ID, the key number of the title key used for the encryption, and a file size (Step S310), and the recording unit 113 records the encrypted adjunct data which is of the encapsulated compressed image in the DVD medium 140 in the form of the file (Step S311).

FIG. 4 shows the data structure of the encapsulated file of the first embodiment. The encapsulated file includes the file ID, the key number of the title key used for the encryption, and the file size, and the encrypted adjunct data. A predetermined value indicating that the file has the encrypted adjunct data is set in the file ID. The key number is a pointer which indicates the record position from the head of the title key file of the title key which is used for the encryption in the title key file. For example, in the case where the value of the key number field is 5, it is indicated that the encrypting process is performed using the title key recorded at the fifth record position in the title key file. The size of the plaintext adjunct data (compressed image) prior to the encrypting process is set in the file size. In addition to the above pieces of information, the data structure of the encapsulated file may include the copy control information. In this case, the adjunct data may be encrypted by using the title key and the copy control information.

In the encapsulated file, in the case of the plaintext in which the file extension is not encapsulated, a file extension may be replaced with an extension different from an extension indicating a particular format, or a still another extension may be added in addition to the file name with the different extension. For example, assuming that the file name is "file A", the extension of the encapsulated file is "aaa", and the extension of the plaintext is "jpg", the name of the encapsulated file can be set to "file A.aaa" and the name may be set to "file A.jpg.aaa".

The key selecting process in Step S308 will be described below. In the DVD recorder 100 of the first embodiment, the title key used in encrypting the adjunct data is selected based on the copy control information of the AV content when the encryption process is performed on the compressed image which is of the adjunct data. Specifically, when the copy control information of the title content from which the adjunct data is derived is information indicating the copy prohibition such as "Copy Never" and "No More Copies", the title key corresponding to the title content (including the adjunct data) from which the adjunct data is derived, i.e., the title key used in encrypting the title content is selected as the title key with which the encrypting process is performed on the adjunct data.

FIG. 5 is an explanatory view for explaining the selection of the title key with which the encrypting process is performed on the adjunct data.

It is assumed that the AV content, the title key, and the management file are recorded on the DVD medium 140 in the state shown in FIG. 5. That is, the AV content #1, the AV content #2, and the AV content #3 are recorded, the title content of the AV content #1 is encrypted by the encrypted title key 2 recorded on the second record position of the title key file, and the state of the content is set at "No More Copies". It is assumed that the AV content #2 is encrypted by the encrypted title key 1 recorded on the first record position of the title key file, and the state of the content is set at "EPN". It is also assumed that the AV content #3 is the plaintext.

As shown in FIG. 5, in the key selecting unit 124 of the first embodiment, the adjunct data generated from the title content of the AV content #1 in which the copy control information indicates the copy restriction such as "No More Copies" is encrypted by the encrypted title key 2 used in the process of encrypting the title content of the AV content #1.

On the other hand, as shown in FIG. 5, in the key selecting unit 124 of the first embodiment, in encrypting the adjunct data generated from the title content of the AV content #2 in which the copy control information indicates no copy restriction such as "EPN" or the copy control information indicates that the copy can be made with restriction, a title key corresponding to the key number 4 is newly generated and registered in the title key file independently of the title key of the AV content #2, and the adjunct data is encrypted by the newly generated title key.

In the state shown in FIG. 5, because only three encrypted title keys are registered in the title key file, the title key newly generated in the fourth record position which is of an empty record of the title key file is recorded by encrypting the title key file with the device secret key. Furthermore, the adjunct data is encrypted by the newly generated title key, an empty field number (4) is set at the key number field, and the adjunct data is encapsulated in the single file and recorded on the DVD medium 140.

Figure 6A:
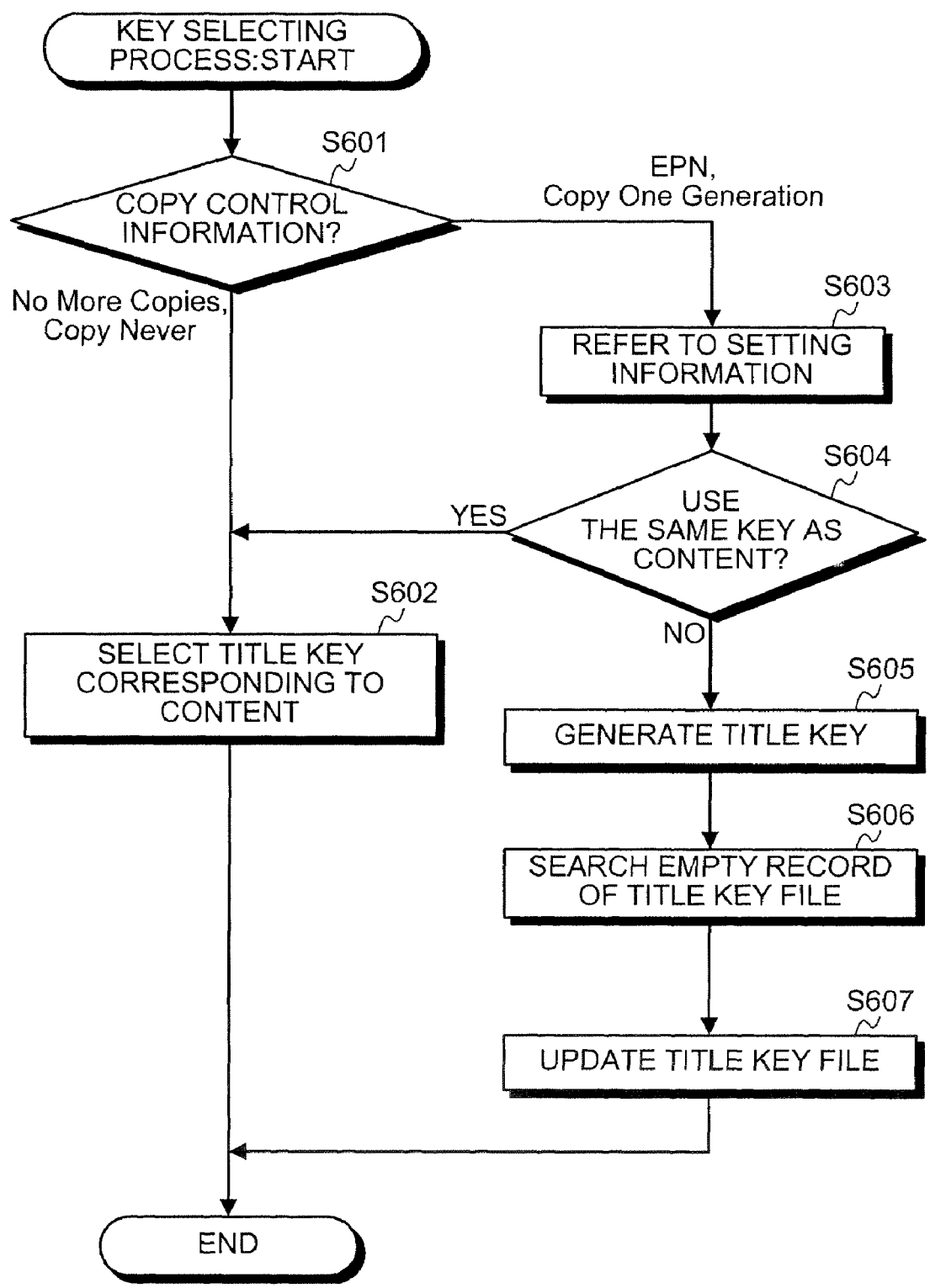
FIG. 6A is a flowchart showing a key selecting process according the first embodiment.

The specific key selecting process performed by the key selecting unit 124 will be described below. FIG. 6A is a flowchart showing the key selecting process performed by the key selecting unit 124 of the first embodiment.

The key selecting unit 124 checks the status of the copy control information on the AV content including the title content which is of the extraction source of the adjunct data (Step S601). When the copy control information indicates the copy restriction such as "No More Copies" or "Copy Never", the key selecting unit 124 selects the title key (encrypted title key) corresponding to the title content which is the extraction source of the adjunct data from the title key file (Step S602). At this point, as shown in FIG. 5, the key number corresponding to the AV content including the title content registered in the management file of the DVD medium 140 is referred to in selecting the title key. When the copy control information indicates "Copy Free", the adjunct data is recorded on the DVD medium 140 while not encrypted by the processes of Steps S302 (No), S312, S313, S310, and S311 in FIG. 3. Even if it is determined that the copy control information indicates "Copy Free" in Step S601 of the key selecting process, the title key is not selected, and the key selecting process is ended without encrypting the adjunct data. Therefore, the adjunct data is recorded on the DVD medium 140 while left in the plaintext by the processes of Steps S309, S310, and S311 in FIG. 3.

On the other hand, in Step S601, when the copy control information indicates no copy restriction such as "EPN" or "Copy One Generation", or when the copy control information indicates that the copy can be made with restriction, the key selecting unit 124 refers to the setting information stored in the setting information storage unit 128 (Step S603), and the key selecting unit 124 determines whether or not the same key as the title key corresponding to the title content which is the extraction source of the adjunct data is used as the key used in encrypting the adjunct data (Step S604).

When it is set in the setting information that the same key as the title key corresponding to the title content which is of the extraction source of the adjunct data is used as the key used in encrypting the adjunct data (Yes in Step S604), the key selecting unit 124 selects the title key (encrypted title key) corresponding to the title content which is of the extraction source of the adjunct data (Step S602).

On the other hand, in Step S604, when it is set in the setting information that the same key as the title key corresponding to the title content which is of the extraction source of the adjunct data is not used as the key used in encrypting the adjunct data (No in Step S604), the key selecting unit 124 newly generates the title key (Step S605). The title key file processing unit 121 searches the empty record of the title key file of the DVD medium 140 (Step S606). Then, the title key file processing unit 121 encrypts the newly generated title key using the device secret key, and the recording unit 113 records the encrypted newly generated title key in the empty record of the title key file, which updates the title key file (Step S607).

Although the host unit 120 of the first embodiment is configured to include the setting information storage unit 128, the host unit 120 may be configured not to include the setting information storage unit 128. In this case, in Step S601, even if the copy control information indicates no copy restriction such as "EPN" or "Copy One Generation", or even if the copy control information indicates that the copy can be made with restriction, the same key as the title key corresponding to the title content which is of the extraction source of the adjunct data may be used as the key used in encrypting the adjunct data as in the case of "No More Copies" or "Copy Never". That is, when the title content is encrypted, irrespective of the copy control information, the same key as the title key corresponding to the title content which is of the extraction source of the adjunct data is used as the key used in encrypting the adjunct data. In this case, it is not necessary to perform the process of judging the copy control information of Step S601.

Alternatively, the copy control information is judged, and the title key may be newly generated to encrypt the adjunct data when the copy control information indicates no copy restriction such as "EPN" or "Copy One Generation" or when the copy control information indicates that the copy can be made with restriction.

Figure 6B:
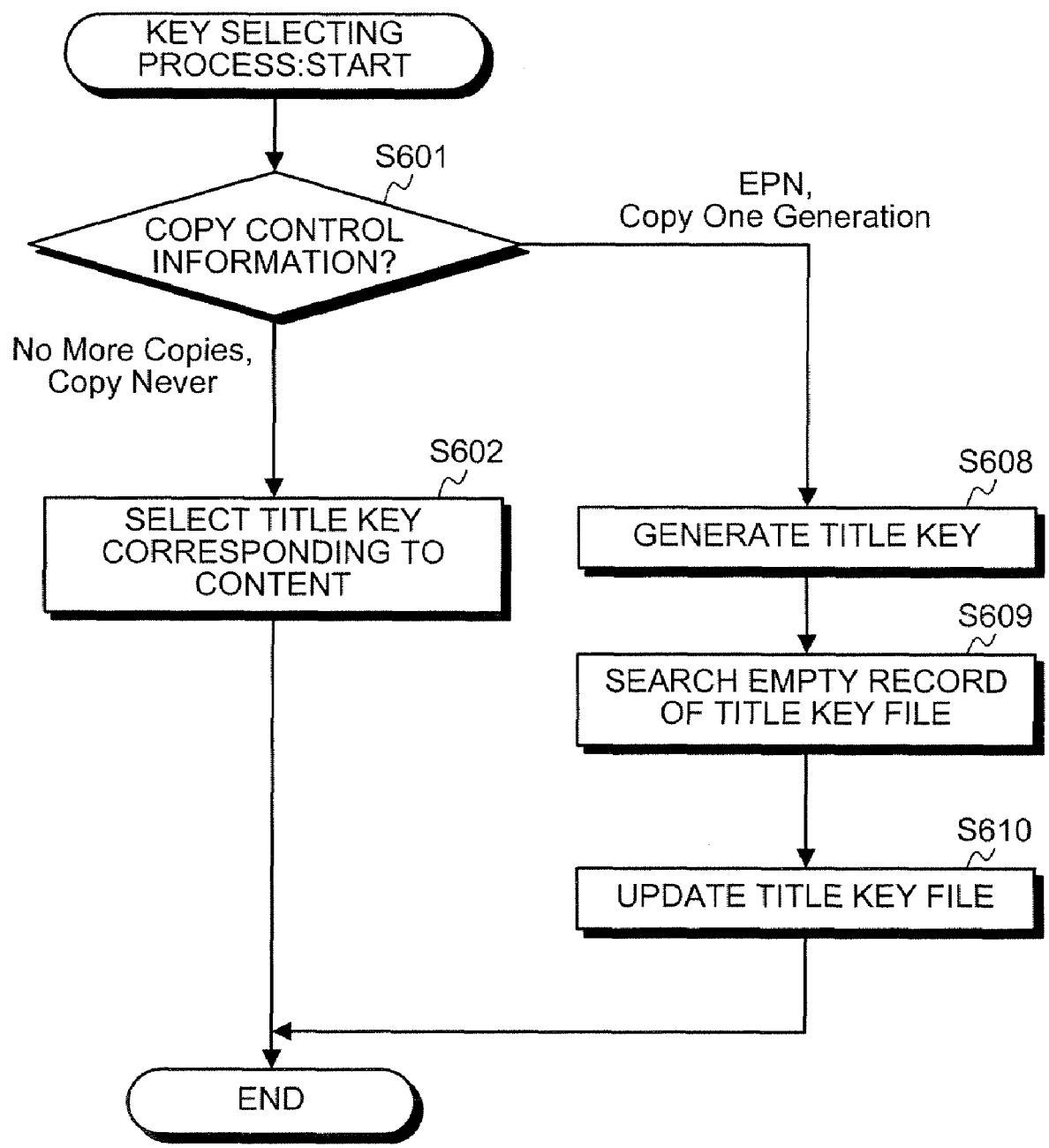
FIG. 6B is a flowchart showing a key selecting process according to a modification of the first embodiment.

FIG. 6B is a flowchart showing a key selecting process which is of a modification of the first embodiment. FIG. 6B shows the key selecting process performed by the key selecting unit 124, when the setting information storage unit does not exist and, at the same time, when determination is made for status of the copy control information.

First, the key selecting unit 124 checks the status of the copy control information on the AV content including the title content of the extraction source of the adjunct data (Step S601). When the copy control information indicates the copy restriction such as "No More Copies" or "Copy Never", the same process as that described in FIG. 6A is performed (Step S602). When the copy control information indicates "Copy Free", the adjunct data is recorded on the DVD medium 140 while left in the plaintext and not encrypted by the processes of Steps S302 (No), S312, S313, S310, and S311 in FIG. 3. Even if it is determined that the copy control information indicates "Copy Free" in Step S601 of the key selecting process, similarly to the process in FIG. 6A, the title key is not selected, the key selecting process is ended without encrypting the adjunct data, and the adjunct data is recorded on the DVD medium 140 while left in the plaintext.

On the other hand, in Step S601, when the copy control information indicates no copy restriction such as "EPN" or "Copy One Generation", or when the copy control information indicates that the copy can be made with restriction, the key selecting unit 124 newly generates the title key (Step S608). The title key file processing unit 121 searches the empty record of the title key file of the DVD medium 140

(Step S609), and the title key newly generated by the title key file processing unit 121 is encrypted by the device secret key. Then, the recording unit 113 records the encrypted new title key in the empty record of the title key file to update the title key file (Step S610).

Thus, in Step S309, the adjunct data (compressed image) is encrypted by the title key selected or generated in the above manner and the encrypted adjunct data is recorded on the DVD medium 140.

The key number corresponding to the AV content including the title content registered in the management file of the DVD medium 140 is referred to when the title key used in encrypting the title content is selected in Step S602. However, the present invention is not limited to the above technique. That is, the key selecting unit 124 may be configured so as to select the title key by referring to the key number set in the key number field of the header portion of the AV content.

Figure 7:
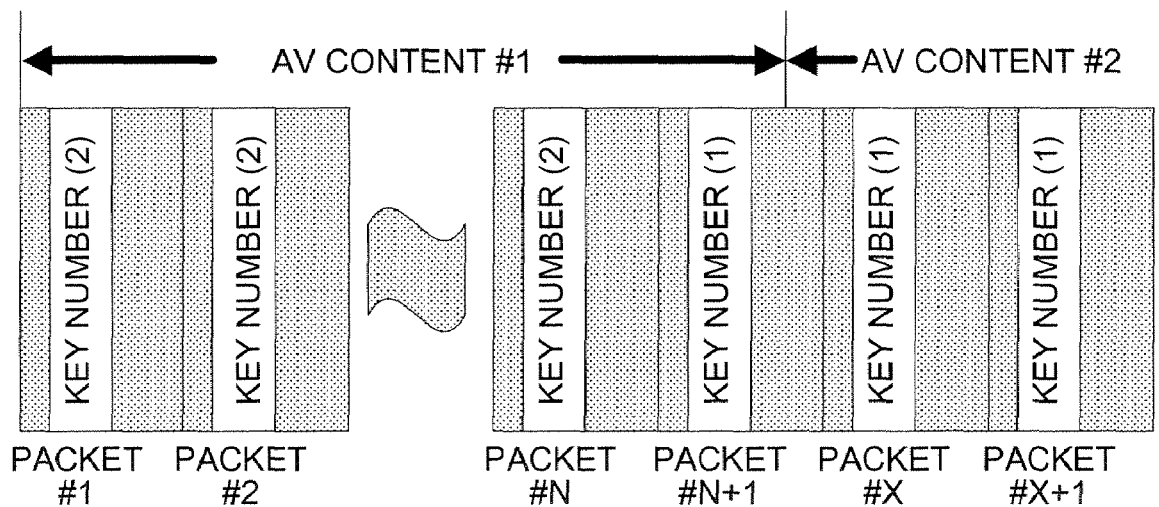
FIG. 7 is a schematic view showing a state in which plural key numbers are set to AV content #1.

For example, as a result of editing the title content, sometimes plural key numbers are set with respect to the AV content #1 and plural title keys are shown in FIG. 7. In FIG. 7, because the key numbers of the packet #1 to packet #N are set at 2 in the AV content #1, the representative title key of the AV content #1 is the encrypted title key recorded on the second record of the title key file. However, because the key number of the last packet #(N+1) is set at 1 in the AV content #1, the packet #(N+1) is encrypted by the title key recorded on the first record of the title key file. Therefore, in the case where the adjunct data is extracted from the packet #(N+1), it is necessary that the adjunct data be encrypted by the title key recorded on the first record of the title key file.

However, because the key number is individually set in each AV content in the management file, the encryption is performed with the title key which is not the title key of the adjunct data of the packet #(N+1), and the adjunct data cannot be protected. In this case, the title key is selected to encrypt the adjunct data by utilizing the key number set in the header portion of the AV content, which allows the content of the adjunct data to be properly protected.

The title key included in the title key file recorded on the DVD medium 140 can be moved to another recording medium. For example, in the case where the built-in HDD unit is included like the DVD recorder 100 of the first embodiment, the encrypted title content stored in the AV data storage unit 132 of the HDD unit can be played by moving the title key recorded on the DVD medium 140 to the HDD unit 130.

Even in the case where the DVD recorder 100 does not include the HDD unit 130 unlike the DVD recorder 100 of the first embodiment, the title key recorded on the DVD medium 140 can be moved to another DVD medium.

Figure 8:
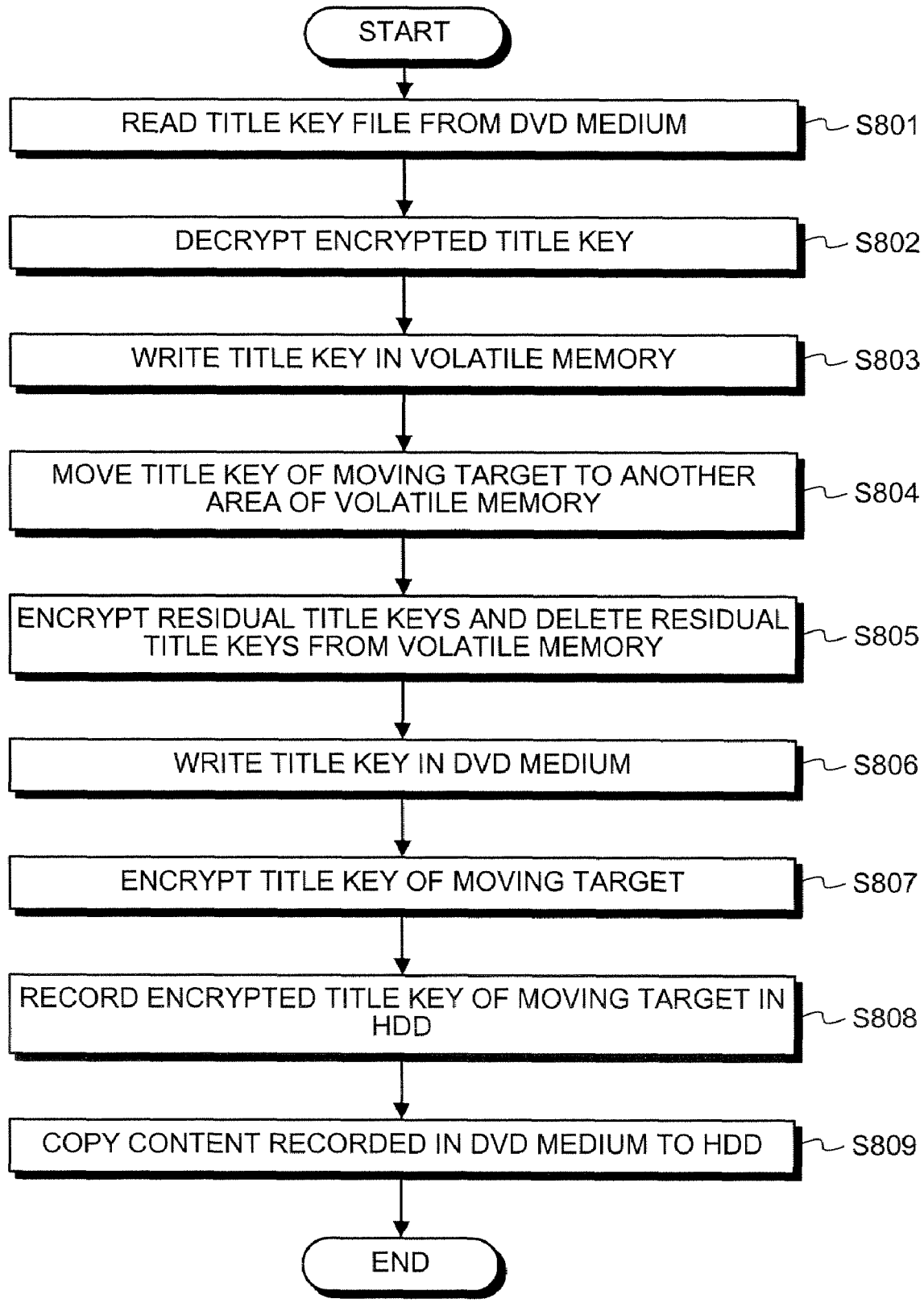
FIG. 8 is a flowchart showing a title key moving process according to the first embodiment.

The movement of the title key recorded on the DVD medium 140 to another recording medium will be described below. A process of moving the title key in the title key file from the DVD medium 140 to the HDD unit 130 performed by the DVD recorder 100 of the first embodiment will be described by way of example. FIG. 8 is a flowchart showing the title key moving process performed by the DVD recorder 100 of the first embodiment.

The readout unit 112 reads the title key file from the DVD medium 140 (Step S801). The title key file processing unit 121 decrypts all the encrypted title keys in the read title key file using the device secret key (Step S802), and the title key file processing unit 121 records all the decrypted title keys in a confidential area of a volatile memory (not shown) (Step S803). The data stored in the confidential area cannot be read from the outside of the DVD recorder 100.

Then, the title key file processing unit 121 moves the title key, which is of the moving target, to an area different from the confidential area of the volatile memory (Step S804).

Then, the title key file processing unit 121 encrypts the residual title keys other than the moving target using the device secret key, and the title key file processing unit 121 deletes the title key from the volatile memory (Step S805).

The recording unit 113 records the title key file including the encrypted title key in the DVD medium 140 (Step S806). Therefore, the title key file including the encrypted title keys of all the title keys except for the moving target are recorded on the DVD medium 140.

Then, the title key file processing unit 121 moves the title key of the moving target from the confidential area of the volatile memory to the key storage unit 131 of the HDD unit 130, and the encryption processing unit 134 encrypts the moved title key (Step S807), and the encrypted title key is stored in the key storage unit 131 (Step S808). In the computation of the key used in the title key moving process, it is preferable that a unique value be included in the DVD recorder 100.

The readout unit 112 reads the encrypted title content from the DVD medium 140 to copy the encrypted title content in the AV data storage unit 132 of the HDD unit 130 (Step S809). At this point, the encrypted title content is not decrypted, but the copy of the encrypted title content is performed in the encrypted state.

The AV content including the encrypted title content in the DVD medium may be deleted, or the AV content may be left in the DVD medium 140.

The title key and the title content encrypted by the title key are stored in HDD incorporated into the DVD recorder 100 through the above title key moving process, so that the title content encrypted by the title key of the moving target can be played with no DVD medium. The encrypted title content is copied to the HDD unit 130 while the title key is moved from the DVD medium 140 to the HDD unit 130 through the above title key moving process, so that the encrypted title content copied (moved) to the HDD unit 130 can be played by decrypting the encrypted title content with the title key moved to the HDD unit 130 even if the DVD medium 140 does not exist.

To explain an attack scenario, consider that the adjunct data is generated from the title content in which the copy control information indicates "No More Copies" and the adjunct data is encrypted by the title key different from the title key used in encrypting the title content unlike the DVD recorder 100 of the first embodiment.

In the initial state, as shown in FIG. 2, the adjunct data does not exist in the DVD medium 140, the AV content including the title content exists in the DVD medium 140, and the encrypted title key 1, the encrypted title key 2, and the encrypted title key 3 are registered in the title key file.

In this case, the adjunct data such as the background image is generated from the AV content #1, the title key is newly generated, and the newly generated title key 4 is recorded on the title key file. At this point, the title key file in the DVD medium has the already registered encrypted title keys 1 to 3 and the newly generated encrypted title key 4.

Next, consider that the encrypted title key 4 is moved to the HDD unit 130 by the title key moving process mentioned above. In this case, the encrypted title key 1, the encrypted title key 2, and the encrypted title key 3 are registered in the title key file of the DVD medium 140.

Then, the adjunct data is generated from the AV content #1 again, an encrypted title key 5 is newly generated, and the encrypted title key 5 is stored in the fourth record of the title key file. At this point, the title key file in the DVD medium 140 has the four title keys of the encryption title key 1, the encrypted title key 2, the encrypted title key 3, and the encrypted title key 5.

When the adjunct data is generated from the AV content #1 in which the copy control information indicates "No More Copies", the adjunct data can be copied with the new title key 4 and title key 5. That is, when the adjunct data is stored in another recording medium along with the newly encrypted title key, the adjunct data can be played with the new title keys 4 and 5 in another recording medium while being able to be played with the title key 1 corresponding to the AV content #1 of the DVD medium. This means that a part of the AV content #1 can be copied as the adjunct data many times although the copy control information of the AV content #1 which is of the extraction source of the adjunct data indicates "No More Copies". Therefore, the copyrights of the AV content and adjunct data cannot be protected.

Because many pieces of adjunct data are copied by the above process, the large part of the AV content can be copied as the adjunct data. In this case, the AV content protected by the copy control information of "No More Copies" is substantially eliminated.

In the DVD recorder 100 of the first embodiment, when the copy control information of the AV content indicates the copy restriction such as "Copy Never" or "No More Copies", the adjunct data is encrypted by the same title key as the title key corresponding to the title content of the AV content. Therefore, the illegal use and illegal copy are prevented in the adjunct data, and the substantial decrease in copyright protection is prevented in the title content.

When the adjunct data is encrypted by the same title key as the title key corresponding to the title content of the AV content, it is necessary that the title key of the title content which is of the extraction source be moved to another recording medium to copy and play back the adjunct data to and from another recording medium. At this point, because the title key corresponding to the title content which is of the extraction source does not exist in the DVD medium, the title content which is of the extraction source in the DVD medium cannot be played. Therefore, even if the adjunct data is copied to another recording medium, the title content which is of the extraction source protected by the copy control information of "Copy Never" or "No More Copies" can be protected.

On the other hand, even if only the adjunct data is copied to another recording medium with no title key, the adjunct data cannot be played because the title key with which the adjunct data is encrypted is recorded on the DVD medium along with the title content which is of the extraction source.

Thus, the illegal use and illegal copy of the adjunct data are prevented in the adjunct data, and the substantial decrease in copyright protection is prevented in the title content.

In the first embodiment, the rewritable medium in which the title key file can be rewritten is described as the DVD medium 140 by way of example. On the other hand, in a write-once medium in which the data can be written once, the title key file cannot be updated. Therefore, because the new title key cannot be generated, the adjunct data can be encrypted by any title key existing in the title key file independently of the copy control information of the title content. Obviously the adjunct data may be encrypted by the same title key as the title key used in encrypting the title content.

In the first embodiment, the image file which is of the adjunct data is generated from the AV content. However, the adjunct data is not limited to the image file. For example, the same process of the first embodiment can also be performed in the case where the data such as an audio file and a text file which can be extracted from the AV content is extracted as the adjunct data.

Figure 9:
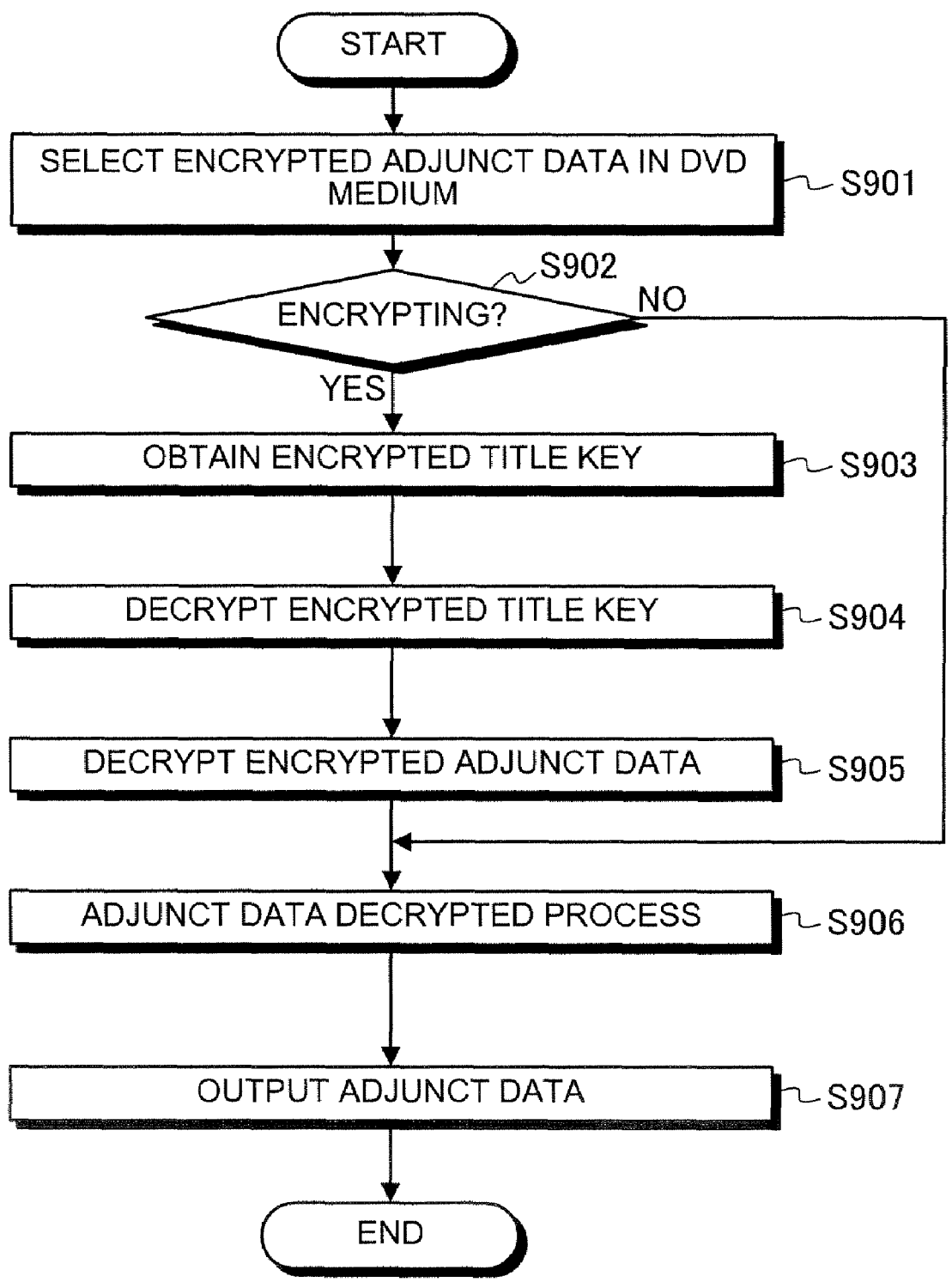
FIG. 9 is a flowchart showing an adjunct data play back process according to the first embodiment.

Next, a process of playing the adjunct data recorded on the DVD medium 140 by the above process will be described below. FIG. 9 is a flowchart showing the adjunct data playing process performed by the DVD recorder 100 of the first embodiment. The adjunct data play back process corresponds to a part of the process of outputting, for example the menu screen of the title content.

First, the host unit 120 selects the adjunct data which is of an output target from the DVD medium 140 (Step S901). The key selecting processing unit 124 checks whether or not the selected adjunct data is encrypted (Step S902). The extension of the encapsulated file described in FIG. 4 is used for the technique of determining whether the adjunct data is the plaintext or the encrypted data.

When the adjunct data is the plaintext (No in Step S902), the AV data decrypting unit 125 decodes the adjunct data (Step S906), and the AV data decrypting unit 125 outputs the adjunct data to a display device (Step S907).

When the adjunct data is encrypted in Step S902 (Yes in Step S902), the title key file processing unit 121 refers to the key number field of the encapsulated file to obtain the encrypted title key corresponding to the key number from the title key file (Step S903). Then, the title key file processing unit 121 decrypts the obtained encrypted title key using the device secret key (Step S904).

The decryption processing unit 122 decrypts the encrypted adjunct data using the decrypted title key (Step S905). The AV data decrypting unit 125 decrypts the adjunct data (Step S906), and the AV data decrypting unit 125 outputs the adjunct data to the display device (Step S907).

Figure 10:
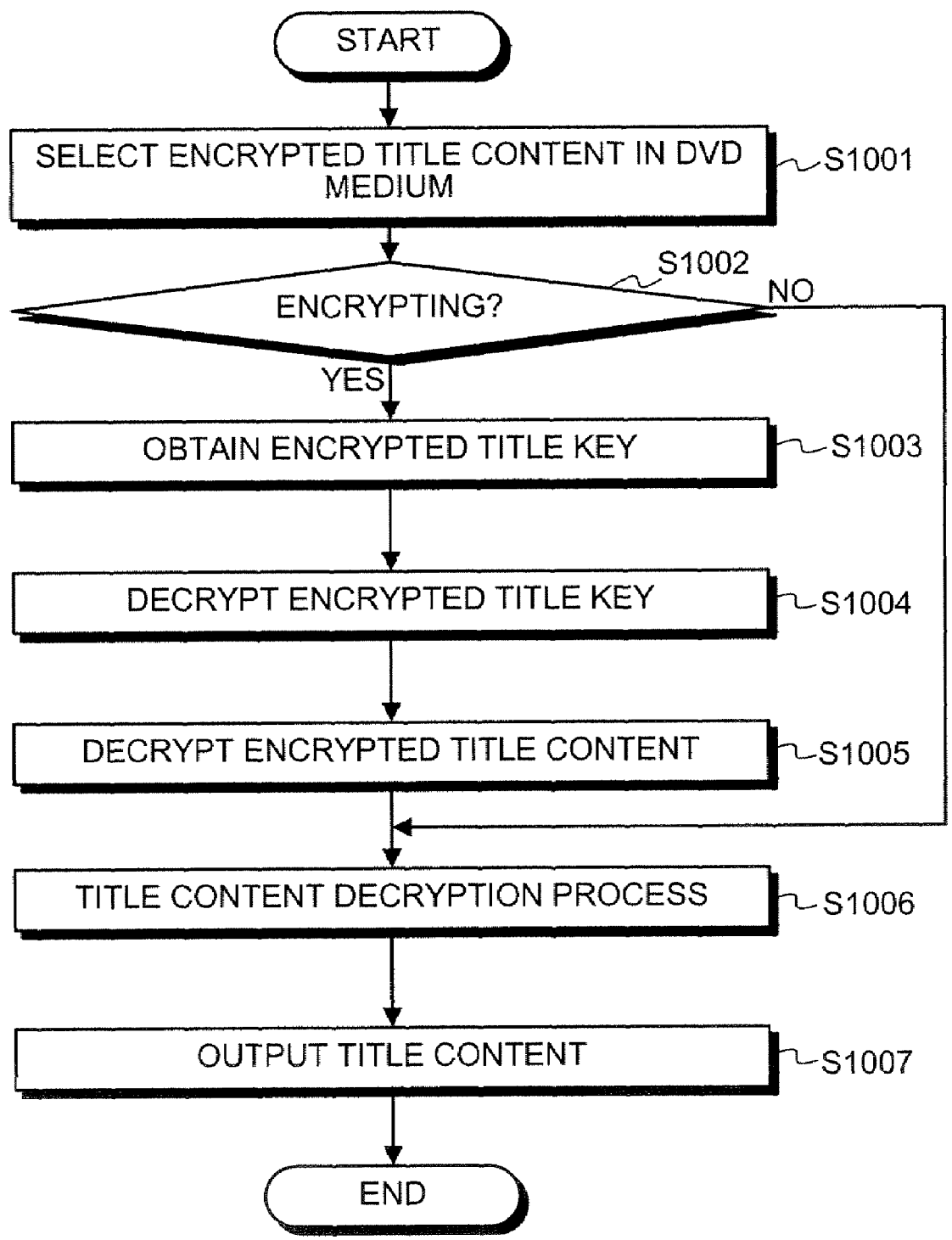
FIG. 10 is a flowchart showing an AV content play back process according to the first embodiment.

Next, the process of play back the AV content recorded on the DVD medium 140 will be described below. FIG. 10 is a flowchart showing the AV content play back process performed by the DVD recorder 100 of the first embodiment.

First, the host unit 120 selects the encrypted content for the AV content which is of an output target from the DVD medium 140 (Step S1001). The key selecting processing unit 124 use the management file in the DVD medium 140 to check whether or not the selected title content is encrypted (Step S1002).

When the title content is the plaintext (No in Step S1002), the AV data decoding unit 125 decodes the title content (Step S1006), and the AV data decoding unit 125 outputs the title content to the display device (Step S1007).

When the title content is encrypted in Step S1002 (Yes in Step S1002), the title key file processing unit 121 refers to the key number of the management file to obtain the encrypted title key corresponding to the key number from the title key file (Step S1003). Then, the title key file processing unit 121 decrypts the obtained encrypted title key using the device secret key (Step S1004).

The decryption processing unit 122 decrypts the encrypted title content using the decrypted title key (Step S1005). The AV data decoding unit 125 decodes the title content (Step S1006), and the AV data decoding unit 125 outputs the title content to the display device (Step S1007).

Thus, the adjunct data and title content recorded on the DVD medium 140 are played.

As described above, in the DVD recorder 100 of the first embodiment, when the copy control information of the AV content indicates the copy restriction such as "Copy Never" or "No More Copies", the adjunct data is encrypted by the same title key as the title key corresponding to the title content of the AV content. Therefore, the illegal use and illegal copy are prevented in the adjunct data, and the copyright protection is strengthened in the title content.

A Second Embodiment Will Be Described Below

In the DVD recorder 100 of the first embodiment, the title key with which the adjunct data is encrypted is managed in the title key file. On the other hand, in the DVD recorder 100 of the second embodiment, the title key which is newly generated to encrypt the adjunct data is managed in a file different from the title key file.

Figure 11:
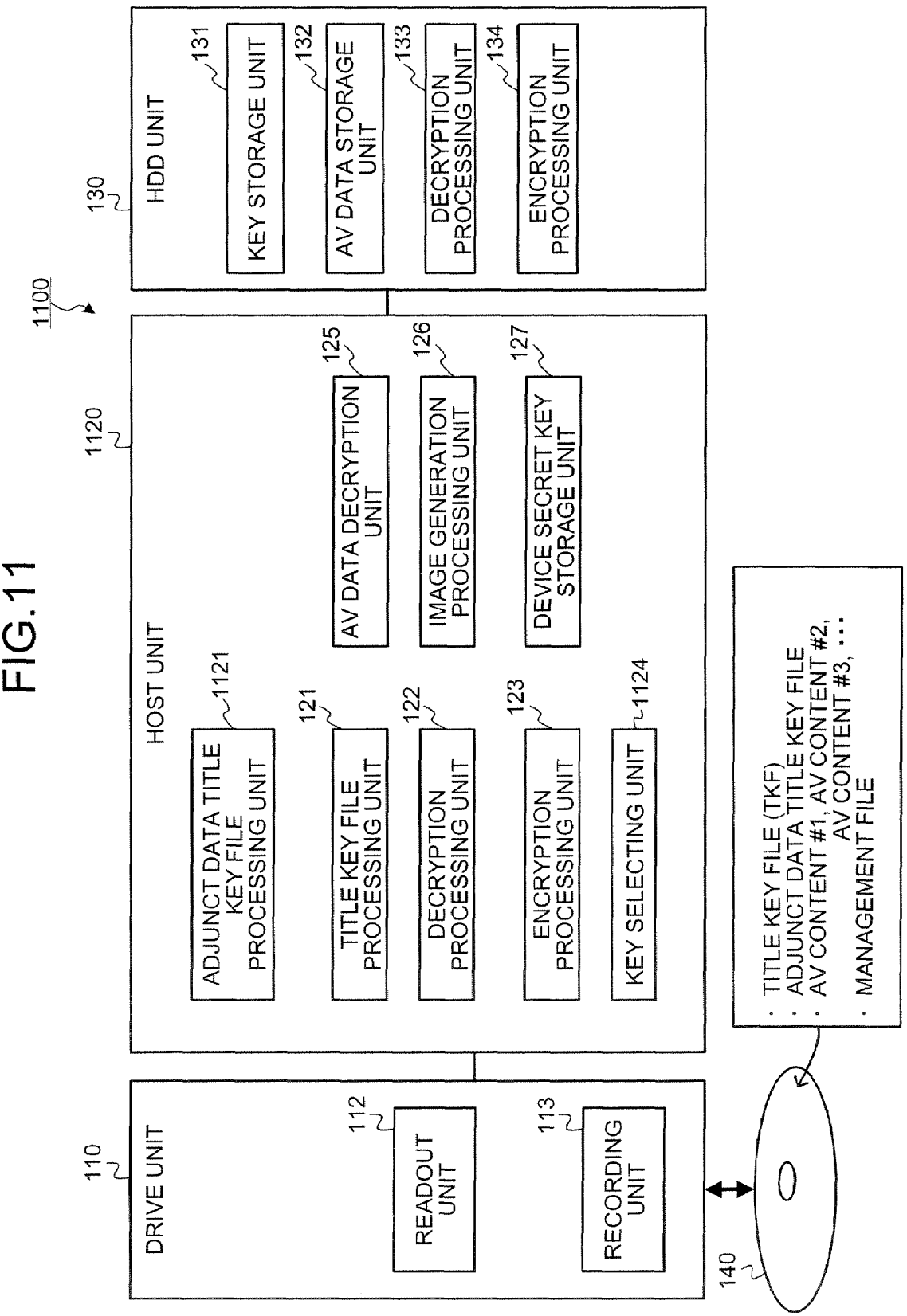
FIG. 11 is a block diagram showing a functional configuration of a DVD recorder according to a second embodiment.

FIG. 11 is a block diagram showing a configuration of a DVD recorder 1100 according to a second embodiment. As shown in FIG. 11, a DVD recorder 1100 of the second embodiment includes the drive unit 110, a host unit 1120, and the HDD unit 130. The drive unit 110 records data in the DVD medium 140, and the drive unit 110 reads data from the DVD medium 140. The host unit 1120 performs the encrypting process and decrypting process of the title content or title key, and the host unit 1120 performs a process of generating the adjunct data from the decrypted title content. The title content is stored in the HDD unit 130. Similarly to the first embodiment, the drive unit 110 and the host unit 1120 and the host unit 1120 and the HDD unit 130 are connected with the generic bus or the dedicated special bus.

Similarly to the first embodiment, the DVD recorder 1100 may be configured not to include the HDD unit 130.

Similarly to the first embodiment, the title key file (TKF), the plural AV content (AV content #1, AV content #2, and AV content #3), and the management file are recorded on the form of the file in the DVD medium 140. The second embodiment differs from the first embodiment in that an adjunct data title key file which manages the adjunct data is stored in the DVD medium 140.

The adjunct data title key file has the same structure as the title key file shown in FIG. 2, and the adjunct data title key file has the structure in which plural encrypted title keys are registered. The encrypted title key is one in which the title key is encrypted in encrypting the adjunct data.

In the DVD recorder 1100 of the second embodiment, the drive unit 110 and the HDD unit 130 have the same configurations as those of the first embodiment. The DVD recorder 1100 of the second embodiment differs from the DVD recorder 100 of the first embodiment in that the host unit 1120 includes an adjunct data title key file processing unit 1121 and a key selecting unit 1124 while the host unit 1120 does not include the function of the key selecting unit 124 and the setting information storage unit 128. However, similarly to the first embodiment, the host unit 1120 includes the title key file processing unit 121, the decryption processing unit 122, the encryption processing unit 123, the AV data decoding unit 125, the image generation processing unit 126, and the device secret key storage unit 127.

The adjunct data title key file processing unit 1121 encrypts and stores the title key in the adjunct data title key file. The adjunct data title key file processing unit 1121 decrypts the encrypted title key registered in the adjunct data title key file of the DVD medium 140, and encrypts the adjunct data using the title key. The key selecting unit 1124 differs from the key selecting unit 124 of the first embodiment in that the title key is newly generated irrespective of the status of the copy control information of the AV content including the title content which is of the extraction source of the adjunct data.

The adjunct data generating process performed by the DVD recorder 1100 of the second embodiment is similar to the adjunct data generating process of the first embodiment described in FIG. 3. The second embodiment differs from the first embodiment in the key selecting process.

Figure 12:
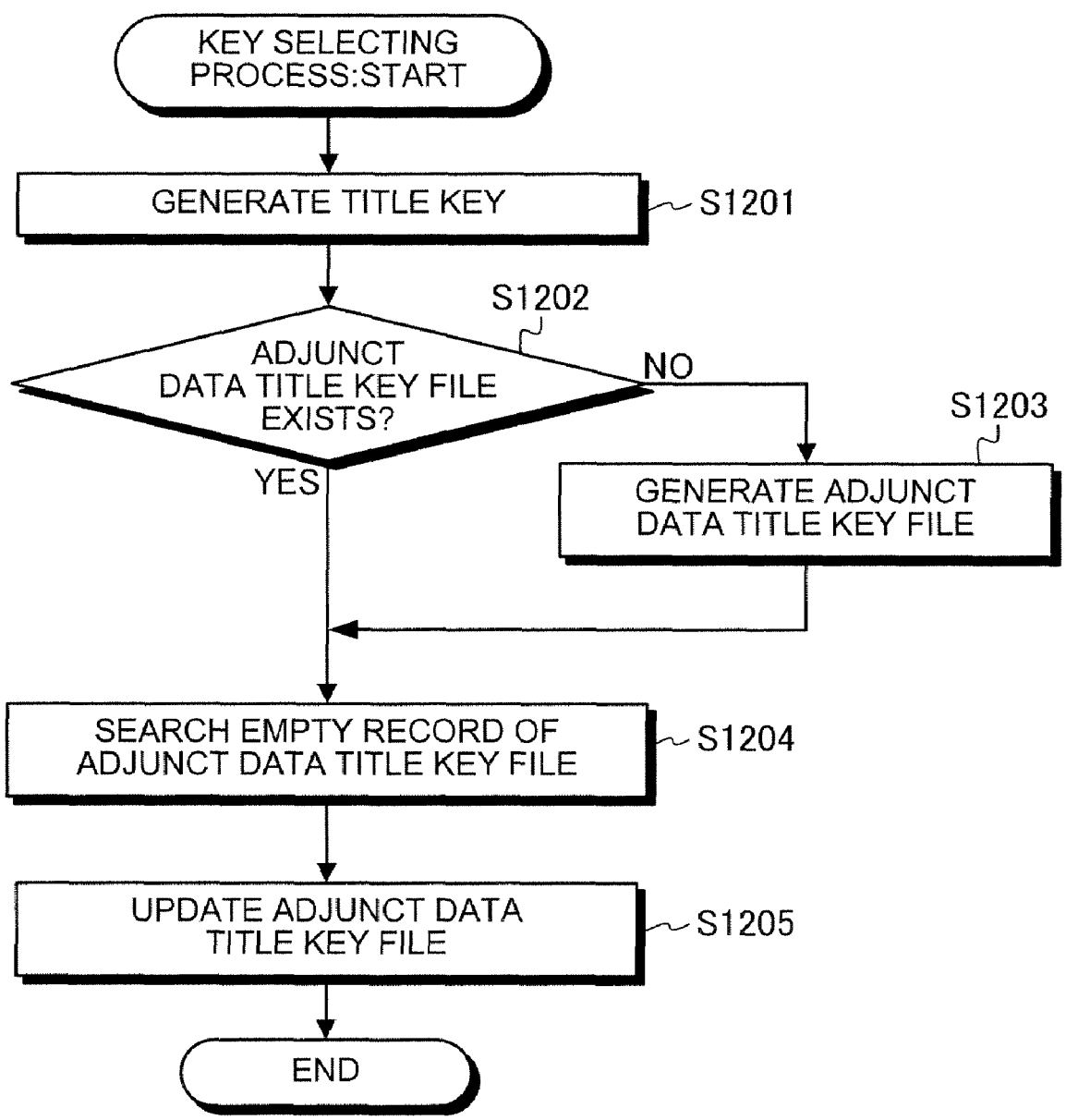
FIG. 12 is a flowchart showing a key selecting process according the second embodiment.

The key selecting process in Step S308 performed by the DVD recorder 1100 will be described below. FIG. 12 is a flowchart showing a procedure of the key selecting process performed in Step S308 by the DVD recorder 1100 of the second embodiment. The key selecting unit 124 newly generates the title key irrespective of the status of the copy control information of the AV content including the title content which is of the extraction source of the adjunct data (Step S1201). The adjunct data title key file processing unit 1121 checks whether or not the adjunct data title key file exists in the DVD medium 140 (Step S1202). When the adjunct data title key file does not exist (No in Step S1202), the adjunct data title key file is newly generated (Step S1203). When the adjunct data title key file exists (Yes in Step S1202), the adjunct data title key file is not generated.

Next, the adjunct data title key file processing unit 1121 search the empty record of the adjunct data title key file in the DVD medium 140 (Step S1204). The adjunct data title key file processing unit 1121 encrypts the newly generated title key using the device secret key, the recording unit 113 updates the adjunct data title key file by recording the newly encrypted title key in the empty record of the title key file (Step S1205).

Thus, similarly to the first embodiment, the adjunct data (compressed image) is encrypted by generated title key and recorded on the DVD medium 140.

The title key file processing unit 121 of the DVD recorder 1100 of the second embodiment prohibits the title key stored in the adjunct data title key file from being moved to another recording medium such as the HDD unit 130. Specifically, even if the operation that the title key registered in the adjunct data title key file is moved to another recording medium is performed, the title key file processing unit 121 rejects the moving operation. Alternatively, in the title key moving process shown in FIG. 8, the process of moving the title key which is of the moving target in Step S804 from the confidential area of the volatile memory to another area is not performed on the title key registered in the adjunct data title key file. Therefore, the adjunct data copy which is enabled by the movement of the title key with which the adjunct data is encrypted to another recording medium can be prevented.

The adjunct data play back process in the second embodiment is performed in the same way as the adjunct data play back process of FIG. 9 in the first embodiment except that the title key is obtained from the adjunct data title key file.

The title content play back process in the second embodiment is performed in the same way as the title content play back process of FIG. 10 in the first embodiment.

Thus, in the DVD recorder 1100 of the second embodiment, the title key with which the adjunct data is encrypted is managed in the adjunct data title key file different from the title key file, and the title key registered in the adjunct data title key file is prohibited from being moved to another recording medium. Therefore, the title key of the adjunct data is easily managed, the illegal use and illegal copy are prevented in the adjunct data, and the copyright protection is strengthened in the title content.

Figure 13:
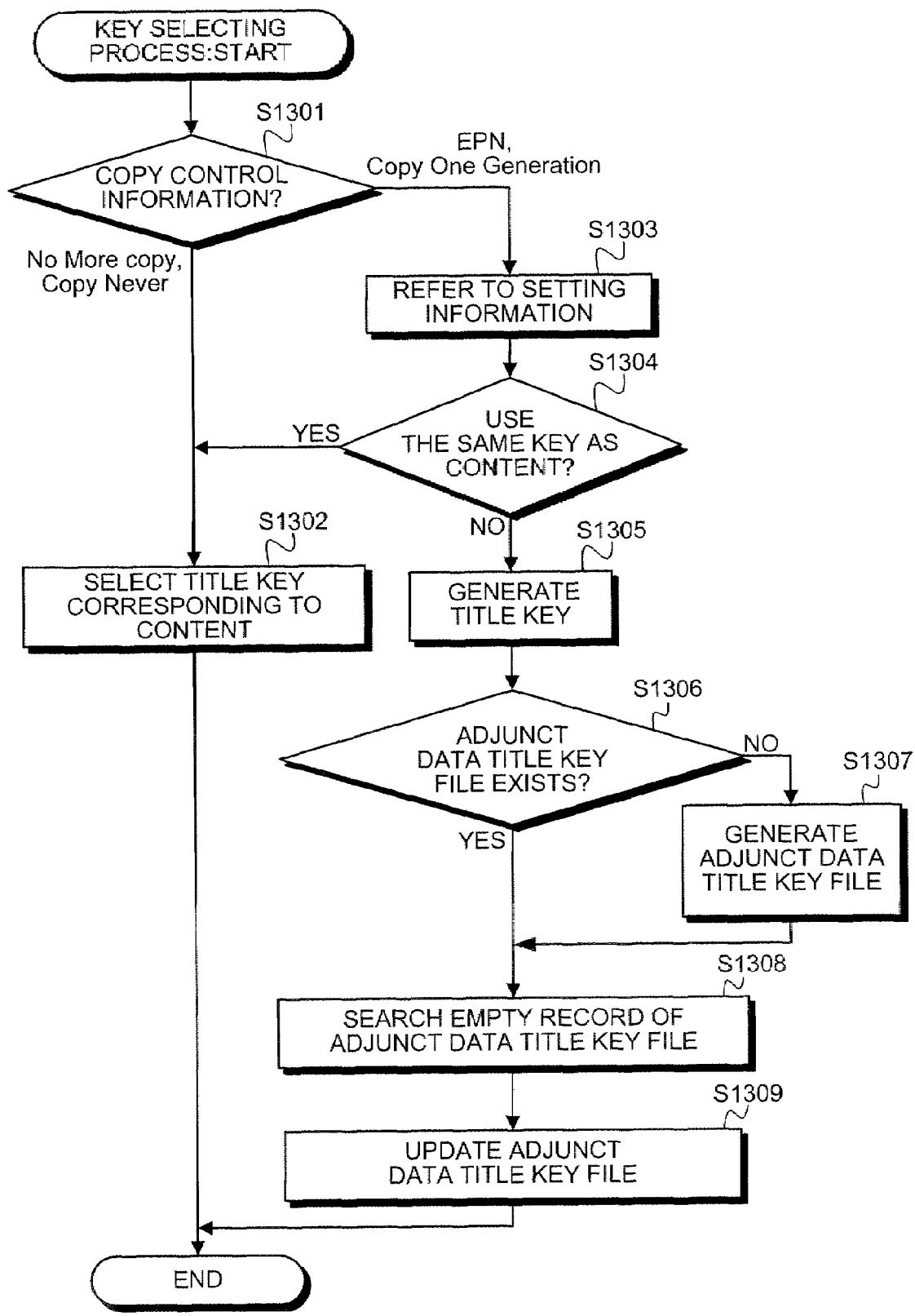
FIG. 13 is a flowchart showing a key selecting process according a modification of the second embodiment.

In the second embodiment, the title key with which the adjunct data is encrypted is stored in the adjunct data title key file irrespective of the copy control information of the title content. Alternatively, the copy control information is judged, and the title key with which the adjunct data is encrypted may be stored in the adjunct data title key file depending on the copy control information. FIG. 13 is a flowchart showing a key selecting process which is of a modification of the second embodiment. FIG. 13 shows the key selecting process when the title key used in encrypting the adjunct data is stored in the adjunct data title key file depending on the copy control information. In the modification of FIG. 13, similarly to the first embodiment, it is assumed that the host unit 120 includes the setting information storage unit 128. However, the present invention is not limited to the configuration in which the host unit 120 includes the setting information storage unit 128.

The key selecting unit 1124 checks the status of the copy control information on the AV content including the title content which is of the extraction source of the adjunct data (Step S1301). When the copy control information indicates the copy restriction such as "No More Copies" or "Copy Never", similarly to the first embodiment, the key selecting unit 1124 selects the title key (encrypted title key) corresponding to the title content which is of the extraction source of the adjunct data from the title key file (Step S1302). When the copy control information indicates "Copy Free", the adjunct data is recorded on the DVD medium 140 while left in the plaintext through the processes of Steps S302(No), S312, S313, S310, and S311 of FIG. 3. Even if the copy control information indicates "Copy Free" in Step S1301 of the key selecting process, the key selecting process is ended while the title key is not selected to encrypt the adjunct data. Therefore, the adjunct data is recorded on the DVD medium while left in the plaintext through the processes of Steps S309, S310, and S311 of FIG. 3.

In Step S1301, when the copy control information indicates that the copy can be made with no restriction or with restriction like "EPN" or "Copy One Generation", the key selecting unit 1124 refers to the setting information stored in the setting information storage unit 128 (Step S1303) to determine whether or not the same key as the title key corresponding to the title content which is of the extraction source of the adjunct data is used as the key with which the adjunct data is encrypted (Step S1304).

When it is set in the setting information that the same key as the title key corresponding to the title content which is of the extraction source of the adjunct data is used as the key used in encrypting the adjunct data (Yes in Step S1304), the key selecting unit 1124 selects the title key (encrypted title key) corresponding to the title content which is of the extraction source of the adjunct data (Step S1302).

On the other hand, in Step S1304, when it is set in the setting information that the same key as the title key corresponding to the title content which is of the extraction source of the adjunct data is not used as the key used in encrypting the adjunct data (No in Step S1304), the key selecting unit 124 newly generates the title key (Step S1305).

Then, the adjunct data title key file processing unit 1121 checks whether or not the adjunct data title key file exists in the DVD medium 140 (Step S1306). When the adjunct data title key file does not exist (No in Step S1306), the adjunct data title key file processing unit 1121 newly generates the adjunct data title key file (Step S1307). When the adjunct data title key file exists (Yes in Step S1306), the adjunct data title key file processing unit 1121 does not generate the adjunct data title key file.

Then, the adjunct data title key file processing unit 1121 searches the empty record of the adjunct data title key file in the DVD medium 140 (Step S1308). The adjunct data title key file processing unit 1121 encrypts the newly generated title key using the device secret key, and the recording unit 113 updates the adjunct data title key file by recording the newly encrypted title key in the empty record of the title key file (Step S1309).

In the modification of the key selecting process, similarly to the first embodiment, the host unit 120 includes the setting information storage unit 128. However, it is also possible to adopt the configuration in which the copy control information is judged without providing the setting information storage unit 128. In this case, as shown in FIG. 6B, when the copy control information indicates that the copy can be made with no restriction or with restriction like "EPN" or "Copy One Generation", the host unit 120 may be configured such that the new title key is generated without making the determination of the setting information (namely, without performing the processes of Steps S1303 and S1304).

Although the plural title keys are stored in the adjunct data title key file in the second embodiment, the present invention is not limited to the second embodiment. Alternatively, for example, the number of title keys being able to be registered in the adjunct data title key is limited to one, all the plural pieces of image adjunct data are encrypted by the same title key, and the title key may be configured not to be moved.

Although the adjunct data title key and the title key file used in encrypting the title content are individually formed in the second embodiment, the present invention is not limited to the second embodiment. For example, the adjunct data title key is registered in the title key file, in which the title key used in encrypting the title content is stored, while separated from the title key, and the management may be performed such that only the adjunct data title key cannot be moved. In this case, the movement of the adjunct data to another recording medium or the copy of the adjunct data can be prevented to realize the same effect as in the first embodiment.

In the first and second embodiments, the title key with which the adjunct data is encrypted is newly generated, when the adjunct data is generated from the title content in which the copy control information indicates "Copy One Generation" or "EPN". In these cases, the adjunct data may be encrypted by the title key corresponding to the title content of the extraction source, i.e., the title key with which the title content of the extraction source is encrypted.

One of the title key used in encrypting the adjunct data generated from the title content in which the copy control information indicates "Copy One Generation" and the title key used in encrypting the adjunct data generated from the title content in which the copy control information indicates "EPN" may be set at the newly generated title key while the other title key is set at the title key corresponding to the title content of the extraction source.

The content recording program executed by the DVD recorders of the first and second embodiment is provided while previously incorporated into ROM or the like.

The content recording program executed by the DVD recorders of the first and second embodiment may be configured to be provided in the state in which the content recording program in the installable format or executable format is recorded on the recording medium such as CD-ROM, a flexible disk (FD), CD-R, or DVD, which is readable by a computer.

The content recording program executed by the DVD recorders of the first and second embodiment may be configured to be stored in the computer connected to a network such as the Internet and downloaded through the network. The content recording program executed by the DVD recorders of the first and second embodiment may be configured to be provided or distributed through the network such as the Internet.

The content recording program executed by the DVD recorders of the first and second embodiment is formed in a module structure including the host unit 120, the drive unit 110, and the HDD unit 130. In the actual hardware, CPU (processor) reads the content recording program from ROM to execute the content recording program, which generates each unit on the main storage device by loading each unit on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content recording apparatus comprising:
a determining unit that determines whether a copy control information indicates whether or not a title content on a recording medium is free to copied, the title content being encrypted and including at least one of video data and audio data, such that the title content can be copied without restriction, the copy control information indicating a type of copy restriction on the title content in the recording medium, the copy control information corresponding to the title content, the copy control information being used for decrypting the title content, the recording medium recording thereon the copy control information, one or more title key, the title content encrypted by the title key and the copy control information;
a key selecting unit that performs selecting an encryption key for performing an encrypting process to adjunct data from the recording medium, and does not perform selecting the encryption key for performing an encrypting process to the adjunct data when the copy control information indicates that the title content is free to be copied, the adjunct data being generated from a portion of the at least one of video data and audio data that is copied from a plain title content, the plain title content being obtained by decrypting the title content by using a decrypted title key and the copy control information, the decrypted title key being generated by decrypting the title key by using a device secret key;
an encryption processing unit that performs an encrypting process to the adjunct data by using the encryption key when the copy control information does not indicate that the title content is free to be copied; and
a recording unit that records the adjunct data to which the encryption process is performed and the encryption key in the recording medium.

2. The apparatus according to claim 1, wherein the key selecting unit selects the encryption key as the title key corresponding to the title content from which the adjunct data is extracted, when the copy control information of the title content indicates copy prohibition, wherein the title content is encrypted by the title key and the adjunct data is extracted from the title content,
the encryption processing unit performs the encrypting process to the adjunct data by the selected title key, when the copy control information of the title content indicates copy prohibition, wherein the title content is encrypted by the title key and the adjunct data is generated from data that is extracted from the plain title content, and
the recording unit records the adjunct data to which the encrypting process is performed by the encryption processing unit and the selected title key in the recording medium, when the copy control information of the title content indicates copy prohibition wherein the title content is encrypted by the title key and the adjunct data is generated from data that is extracted from the plain title content.

3. The apparatus according to claim 2, wherein the key selecting unit selects the encryption key as the title key corresponding to the title content from which the adjunct data is generated from data that is extracted, when the copy control information of the title content indicates that the title content cannot be copied or cannot be copied again, wherein the title content is encrypted by the title key and the adjunct data is generated from data that is extracted from the plain title content.

4. The apparatus according to claim 2, wherein the encryption processing unit does not perform the encrypting process to the adjunct data, when the title content is judged to be a plaintext based on the copy control information, and
the recording unit records the unencrypted adjunct data, when the title content is judged to be a plaintext based on the copy control information.

5. The apparatus according to claim 4, wherein the encryption processing unit does not perform the encrypting process to the adjunct data, when the copy control information indicates that the title content is free to be copied, and
the recording unit records the unencrypted adjunct data, when the copy control information indicates that the title content is free to be copied.

6. The apparatus according to claim 2, wherein the plurality of title content, a title key file which registers the plurality of title keys corresponding to the plurality of title content respectively, and an adjunct data title key file which registers the title key used in encrypting the adjunct data are further recorded on the recording medium, and
the recording unit updates the adjunct data title key file by registering the selected title key in the adjunct data title key file.

7. The apparatus according to claim 1, wherein the key selecting unit newly generates an encryption key used in performing the encrypting process to the adjunct data based on the copy control information of the title content from which the adjunct data is generated from data that is extracted.

8. The apparatus according to claim 7, wherein the key selecting unit newly generates an encryption key used in performing the encrypting process to the adjunct data, when the title content from which the adjunct data is generated from data that is extracted is encrypted and, at the same time, the copy control information of the title content indicates copy is permitted.

9. The apparatus according to claim 8, wherein the key selecting unit newly generates an encryption key used in performing the encrypting process to the adjunct data, when the title content to which the adjunct data is encrypted and, at the same time, the copy control information of the title content indicates that the number of copies of the title content is not restricted but the title content is still to be encrypted or that the title content can only be copied in one generation.

10. The apparatus according to claim 8, wherein the plurality of title content, and a title key file which registers the plurality of title key corresponding to the plurality of title content respectively are further recorded on the recording medium, and
the recording unit additionally records the newly generated encryption key as the title key in the title key file.

11. The apparatus according to claim 8, further comprising a setting information storage unit that stores setting information indicating a type of a key used as the encryption key, wherein
the key selecting unit encrypts the adjunct data by the title key corresponding to the title content from which the adjunct data is generated from data that is extracted, when the setting information indicates use of the title key of the title content from which the adjunct data is generated from data that is extracted.

12. The apparatus according to claim 11, wherein the key selecting unit generates the new encryption key to perform the encrypting process to the adjunct data by the newly generated encryption key, when the setting information indicates that the title key of the title content from which the adjunct data is generated from data that is extracted is not used.

13. The apparatus according to claim 8, wherein the plurality of title content, a title key file which registers the plurality of title keys corresponding to the plurality of title content and the adjunct data respectively, and an adjunct data title key file which registers the plurality of title key used in encrypting the adjunct data are further recorded on the recording medium, and the recording unit additionally records the newly generated encryption key as the title key in the adjunct data title key file.

14. The apparatus according to claim 1, wherein the recording unit records the adjunct data to which the encrypting process is performed by the encryption processing unit and key information on the selected encryption key in the recording medium as a single file.

15. A content recording method comprising:

determining, by a processor, whether a copy control information indicates whether or not a title content on a recording medium is free to be copied, the title content being encrypted and including at least one of video data and audio data, such that the title content can be copied without restriction, the copy control information indicating a type of copy restriction on the title content in the recording medium, the copy control information corresponding to the title content, the copy control information being used for decrypting the title content, the recording medium recording thereon the copy control information, one or more title key, the title content encrypted by the title key and the copy control information;

performing selecting an encryption key for performing an encrypting process to adjunct data from the recording medium, and not performing selecting the encryption key for performing an encryption process to the adjunct data when the copy control information indicates that title content is free to be copied, the adjunct data being generated from a portion of the at least one of video data and audio data that is copied from a plain title content, the plain title content being obtained by decrypting the title content by using a decrypted title key and the copy control information, the decrypted title key being generated by decrypting the title key by using a device secret key;

performing an encrypting process to the adjunct data by using the encryption key when the copy control information does not indicate that the title content is free to be copied; and recording the adjunct data to which the encryption process is performed and the encryption key in the recording medium.

16. A non-transitory computer readable storage medium including programmed instructions for recording content, wherein the instructions, when executed by a computer, cause the computer to perform:

determining whether a copy control information indicates whether or not a title content on a recording medium is free to be copied, the title content being encrypted and including at least one of video data and audio data, such that the title content can be copied without restriction, the copy control information indicating a type of copy restriction on the title content in the recording medium, the copy control information corresponding to the title content, the copy control information being used for decrypting the title content, the recording medium recording thereon the copy control information, one or more title key, the title content encrypted by the title key and the copy control information;

performing selecting an encryption key for performing an encrypting process to adjunct data from the recording medium, and not performing selecting the encryption key for performing an encryption process to the adjunct data when the copy control information indicates that title content is free to be copied, the adjunct data being generated from a portion of the at least one of video data and audio data that is copied from a plain title content, the plain title content being obtained by decrypting the title content by using a decrypted title key and the copy control information, the decrypted title key being generated by decrypting the title key by using a device secret key;

performing an encrypting process to the adjunct data by using the encryption key when the copy control information does not indicate that the title content is free to be copied; and recording the adjunct data to which the encryption process is performed and the encryption key in the recording medium.

17. A encrypting apparatus comprising:

a determining unit that determines whether a copy control information indicates whether or not a title content on a recording medium is free to copied, the title content being encrypted and including at least one of video data and audio data, such that the title content can be copied without restriction, the copy control information indicating a type of copy restriction on the title content in the recording medium, the copy control information corresponding to the title content, the copy control information being used for decrypting the title content, the recording medium recording thereon the copy control information, one or more title key, the title content encrypted by the title key and the copy control information;

a key selecting unit that performs selecting an encryption key for performing an encrypting process to adjunct data from the title key recorded in the recording medium, and does not perform selecting the encryption key for performing an encrypting process to the adjunct data when the copy control information indicates that the title content is free to be copied, the adjunct data being generated from a portion of the at least one of video data and audio data that is copied from a plain title content, the plain title content being obtained by decrypting the title content by using a decrypted title key and the copy control information, the decrypted title key being generated by decrypting the title key by using a device secret key;

an encryption processing unit that performs an encrypting process to the adjunct data by using the encryption key when the copy control information does not indicate that the title content is free to be copied; and an output unit that outputs the adjunct data to which the encryption process is performed and the encryption key to the recording medium.

* * * * *